(No Model.)
F. E. BARBOUR.
LUGGAGE CARRIER FOR BICYCLES.
No. 475,174. Patented May 17, 1892.
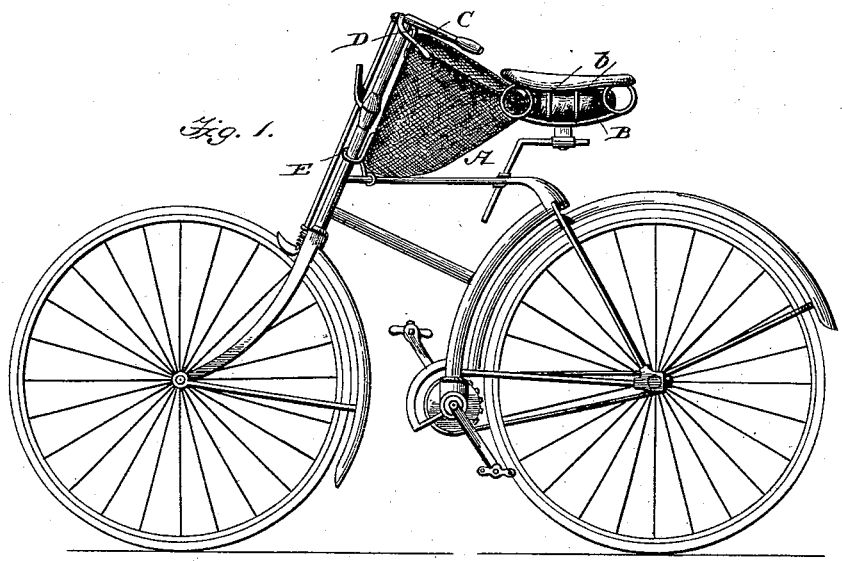
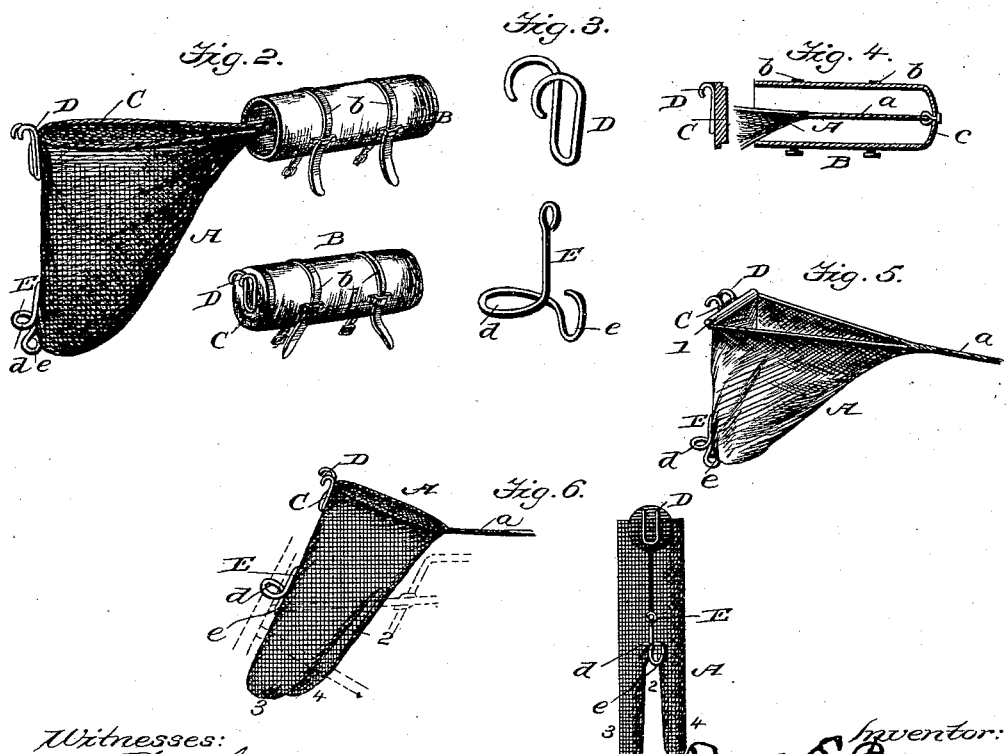
Witnesses:
Inventor:
Fred E. Barbour
By Wm. C. Dye
Attorney.

UNITED STATES PATENT OFFICE.

FRED E. BARBOUR, OF WASHINGTON, DISTRICT OF COLUMBIA.

LUGGAGE-CARRIER FOR BICYCLES.

SPECIFICATION forming part of Letters Patent No. 475,174, dated May 17, 1892.

Application filed September 14, 1891. Serial No. 405,648. (No model.)

*To all whom it may concern:*

Be it known that I, FRED E. BARBOUR, a citizen of the United States, residing at Washington, in the District of Columbia, have invented certain new and useful Improvements in Luggage-Carriers for Bicycles; and I do hereby declare the following to be a full, clear, and exact description of the invention, such as will enable others skilled in the art to which it appertains to make and use the same.

My invention, which relates to luggage-carriers for vehicles, is especially designed and adapted for use on bicycles and tricycles, having for its object the production of a compact, cheap, light, and durable carrier, easily applied to a bicycle, and affording a spacious ready receptacle for packages that may therein be carried without liability of injury from binding-straps or similar contrivances.

The invention will be hereinafter described, and particularly pointed out in the claims.

In the accompanying drawings, which form part of this specification, Figure 1 represents a side elevation of my improved carrier applied to a bicycle; Fig. 2, detached perspective views of same open and closed; Fig. 3, perspective view of clips for securing the invention to frame of a bicycle; Fig. 4, longitudinal sectional view of case for containing the carrier, and Figs. 5 and 6 modifications of the device.

Reference being had to the drawings and letters and figures thereon, A indicates the body of the carrier, which is preferably knit or made of netting, as shown. The ordinary hammock-stitch is employed for the purpose, and the device terminates in a strand or strands *a*, serving as a fastening for its rear end.

B represents a cylindrical case for containing and housing the carrier when not in use, being made of leather or other suitable material and secured to frame of bicycle-saddle by straps *b b*, encircling both case and frame. In the rear closed end of case B is secured a ring-bolt *c*, to which is fastened the end of strands *a* of the carrier, thus affording a substantial and permanent support for that end thereof.

To the opposite upper end of carrier A is stitched a flanged disk C, corresponding in material and in its circumference to that of case B, serving as a lid or cap for closing the open end of said case when the carrier A has been stored therein and also as a support for a wire clip D, by which the front end of the device is detachably attached to the handle-bar of the bicycle when in use.

Clip D is made of spring-wire, such as brass or phosphor-bronze, is secured to the face of disk C by small staples clinched on the inside, and, as shown by Fig. 3, is substantially U-shaped, its upper ends terminating in an outwardly-projecting double hook, which when in use embraces the handle-bar of the bicycle on both sides of the steering-post.

To steady and further secure the carrier in operative position, a second wire clip E is provided, similar to the first in material, differing, however, in form. This clip is adapted, first, to encircle the steering-post by its loop *d*, and then, passing under the bicycle brace rod or frame to engage the latter in its terminal hook *e*, the spring of the wire allowing such adjustment of the clips D and E, both of which may be incased by sections of rubber-tubing to prevent scratching and to cushion the parts, so as to avoid rattling.

The device having been constructed and applied substantially as described, its use and operation are too apparent to require an explanation. Having served its purpose as a parcel or luggage carrier or it being desired to store the carrier away to avoid the damaging effect of rain, clips D E are released and the netting, together with clip E, forced into case B, followed by disk or cover C, which then serves to close the open end of case B, rendering it water-tight and a snug housing for the device.

Modifications of the carrier are illustrated by Figs. 5 and 6 of the drawings, the former embodying a rod 1, which serves as a spread and gives the carrier an angular form, and the latter, made of greater length, is bifurcated at its lower end, as at 2, and straddles the frame of a bicycle in like manner to a pack-saddle, thus affording greater storing capacity. With a carrier of the latter description a draw-string may be employed for securing the sides together at any particular point for the purpose of reducing the depth thereof, or in a similar manner the two members 3 4 of such bifurcated carrier may be fastened together below the frame of the bicycle to steady the device.

While in the construction of my improved carrier netting is preferred as the material used, cloth, leather, rubber, or rubber fabric may be employed. It is obvious, however, that in the preferred form danger of losing packages is very slight, owing to a tendency of the meshes to catch and retain them. The wind resistance is reduced to a minimum and the device rendered very light in weight without detracting from its durability. Furthermore, the peculiar mode of attachment by strand $a$ renders the device adjustable to fit bicycles having greater or less space between saddle and handle-bar by retaining more or less of it in the case B, as circumstances require. It is also apparent that the device may be provided with a gossamer-cover stitched to one of its upper edges for protecting the contents of the carrier when used during rain or snow storms, and the case B may be made of any shape that will better accommodate it to saddles of different construction without departing from the spirit of my invention.

Having thus fully described my invention, what I claim is as follows:

1. A luggage-carrier for bicycles and similar vehicles, consisting of a bag detachably and adjustably secured at one end to the seat, at its opposite end to the handle-bar, and near its base to the frame of the vehicle.

2. A luggage-carrier for bicycles, consisting of a detachable bag secured at its rear end to the saddle, in combination with spring-clips near its front end and base, securing it to the handle-bar and frame of the bicycle, respectively.

3. A detachable luggage-carrier for bicycles, consisting of a bag secured at one end to the saddle, in combination with a spring-clip in form of a double hook for securing its opposite end to the handle-bar and a spring-clip near its base for encircling the steering-post and engaging the frame of the bicycle.

4. As an article of manufacture, a detachable luggage-carrier consisting of a bag, one end thereof being secured to a case adapted to receive said carrier when not in use.

5. As an article of manufacture, a detachable luggage-carrier consisting of a bag, one end thereof being secured within a case adapted to receive the carrier when not in use, a lid for said case attached to the opposite end of the carrier, and a clip secured to the lid affording a support for same when in use.

In testimony whereof I subscribe my name in presence of two witnesses.

FRED E. BARBOUR.

Witnesses:
MAURICE F. CONNERY,
JOHN E. OWENS.